F. A. STOLL.
VALVE HANDLE.
APPLICATION FILED MAY 21, 1921.
1,388,316.
Patented Aug. 23, 1921.
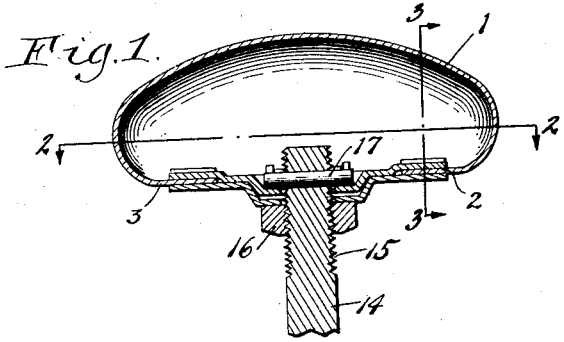
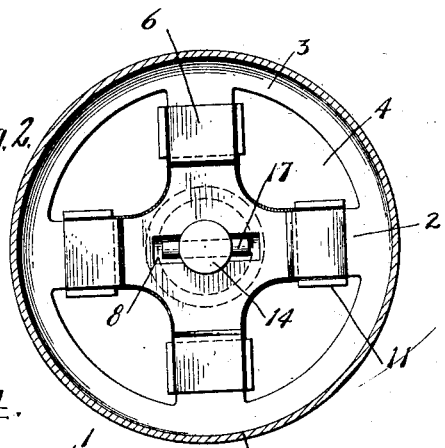
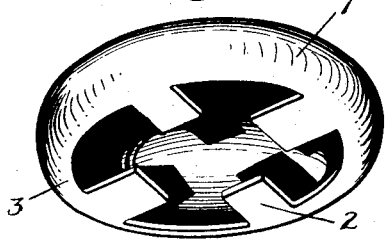
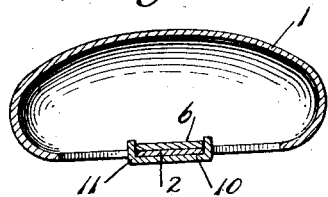
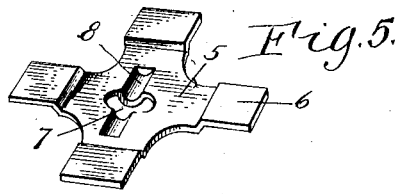
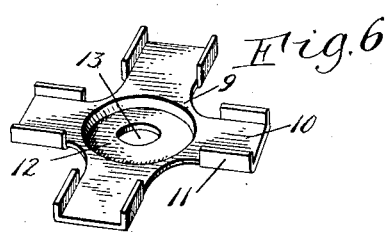
Inventor
Frank A. Stoll
By
Attorney

UNITED STATES PATENT OFFICE.

FRANK A. STOLL, OF BUFFALO, NEW YORK, ASSIGNOR TO AMERICAN RADIATOR COMPANY, OF CHICAGO, ILLINOIS, A CORPORATION OF NEW JERSEY.

VALVE-HANDLE.

1,388,316.  Specification of Letters Patent.  Patented Aug. 23, 1921.

Application filed May 21, 1921. Serial No. 471,389.

*To all whom it may concern:*

Be it known that I, FRANK A. STOLL, a citizen of the United States, residing at Buffalo, in the county of Erie and State of New York, have invented new and useful Improvements in Valve-Handles, of which the following is a full, clear, concise, and exact description, reference being had to the accompanying drawing, forming a part of this specification.

My invention relates to improvements in means for attaching handles to stems and particularly to means for attaching handles to valve stems.

For the purpose of disclosing my invention I have illustrated one embodiment thereof in the accompanying drawings in which—

Figure 1 is a longitudinal sectional view of a stem and handle showing my attaching means;

Fig. 2 is a sectional view taken on the line 2—2 of Fig. 1;

Fig. 3 is a sectional view taken on the line 3—3 of Fig. 1;

Fig. 4 is a perspective view of the improved form of valve handle;

Fig. 5 is a perspective view of the top clamping spider;

Fig. 6 is a perspective view of the bottom clamping spider.

In the embodiment illustrated the handle 1 is preferably formed of sheet metal and is made hollow having on its under face a plurality of inwardly projecting ears 2 which are substantially horizontally disposed and which project inwardly from the annular inturning rim 3 on the outside of the handle. The arrangement of the ears 2 provides spaces 4 between the same to permit the insertion within the hollow handle of the top clamping spider which comprises a hub 5 having radially extending therefrom four arms 6. The hub portion 5 as shown lies in a plane lower than the plane of the arms 6 and is provided with a central aperture 7 and on opposite sides of the aperture a depression or channel 8.

The bottom clamping spider likewise comprises a hub 9 having radially extending therefrom four clamping arms 10 each of which on its sides has a pair of upturned lips 11 adapted to engage when the upper and lower spiders are assembled on either side of the arms 6. The bottom spider has formed in its hub 9 a circular recess or depression 12 and formed in the center of this depression is a central aperture 13.

The stem 14 to which the handle is adapted to be attached is screw-threaded as at 15 at its upper end to receive nut 16. Near the top of the stem a transverse aperture is formed to receive a pin 17.

In assembly the nut 16 is first threaded onto the stem 14 after which the two spiders are assembled on the stem which passes through the apertures 13 and 7 thereof—the nut being threaded down on the stem far enough to permit a spacing of the spiders relatively. After the spiders have been loosely assembled on the stem the pin 17 is inserted in its opening and the handle 1 then placed over the spiders, the openings 4 permitting the top spider to pass onto the handle. The handle is then given a partial rotation until the ears 2, the arms 10 and the arms 6 are in alinement after which the nut 16 is tightened whereby the arms 6 and 10 will securely clamp the ears 2 between the same and at the same time relative rotative movement between the arms and between the arms and the ears is prevented by the upwardly extending lips 11 which, it will be noted, embrace the sides of the lips as well as the sides of the arms 6. It will be noted that the center portion 5 of the upper spider extends into the recess portion 12 of the lower spider but the faces thereof do not meet so that the arms 6 and 10 will securely clamp the ears between the same.

Having thus described my invention, what I claim as new and desire to secure by Letters Patent is:

1. The combination with a stem, of a handle having a recess formed on its under surface and a plurality of inwardly extending ears, an upper and a lower clamping spider mounted on said stem and arranged to clamp between the same the ears of said handle, means for holding said spiders in clamping position, and means for preventing a relative rotation between said spiders and between said spiders and ears.

2. The combination with a stem, of a hollow handle having a plurality of inwardly extending ears, a bottom spider mounted on said stem and having upturned engaging lips disposed, when the spider is in position, on each side of said ears, a top spider having the arms thereof arranged to lie above said ears and between said lips and means for clamping said spiders together.

3. The combination with a stem, of a handle provided with a recess and having inwardly extending ears, means mounted on said stem arranged to engage one side of said ears, means mounted on said stem for engaging the opposite side of said ears, means for preventing said engaging means for rotating relatively to said stem, and means for preventing said engaging means from rotating relatively to each other and to the ears.

4. The combination with a stem having a transversely extending pin near the end thereof, of a hollow handle having a plurality of inwardly extending ears, a top clamping spider limited in vertical movement and in rotative movement by said pin and having its arms adapted to engage above said ears, a bottom clamping spider having its arms engaging beneath said ears, and means for forcing the bottom clamping spider toward the top clamping spider.

5. The combination with a stem screw-threaded and having at its upper end a transversely extending pin, of a hollow handle having inwardly extending ears, a spider having means for engaging said transversely extending pin to prevent relative rotation between said stem and spider, having the arms thereof lying above said ears, a bottom spider having upturned lugs on its arms engaging on either side of said ears and the arms of the top spider and a nut threaded on said stem for clamping the hubs of said spiders between said nut and pin.

In witness whereof, I have hereunto subscribed my name.

FRANK A. STOLL.